United States Patent [19]
Goetz et al.

[11] Patent Number: 5,928,330
[45] Date of Patent: Jul. 27, 1999

[54] SYSTEM, DEVICE, AND METHOD FOR STREAMING A MULTIMEDIA FILE

[75] Inventors: Tom Goetz, Attleboro; Manickam R. Sridhar, Holliston; Mukesh Prasad, Chestnut Hill, all of Mass.

[73] Assignee: Motorola, Inc., Schaumburg, Ill.

[21] Appl. No.: 08/711,701

[22] Filed: Sep. 6, 1996

[51] Int. Cl.⁶ .................................................. G06F 15/16
[52] U.S. Cl. .......................................... 709/231; 709/232
[58] Field of Search ........................... 395/200.6, 200.61, 395/200.66, 200.68, 200.33, 200.62; 707/501, 515, 10, 104

[56] References Cited

U.S. PATENT DOCUMENTS

| | | | |
|---|---|---|---|
| 5,197,083 | 3/1993 | Gandini et al. | 375/10 |
| 5,231,492 | 7/1993 | Dangi et al. | 358/143 |
| 5,333,299 | 7/1994 | Koval et al. | 395/550 |
| 5,339,413 | 8/1994 | Koval et al. | 395/650 |
| 5,463,620 | 10/1995 | Sriram | 370/60 |
| 5,485,147 | 1/1996 | Jaffe et al. | 340/825.5 |
| 5,487,167 | 1/1996 | Dinallo et al. | 395/650 |
| 5,581,703 | 12/1996 | Baugher et al. | 395/200.06 |
| 5,602,582 | 2/1997 | Wanderscheid et al. | 348/12 |
| 5,603,029 | 2/1997 | Aman et al. | 395/675 |
| 5,652,749 | 7/1997 | Davenport et al. | 370/466 |
| 5,659,539 | 8/1997 | Porter et al. | 395/200.61 |
| 5,664,226 | 9/1997 | Czako et al. | 395/872 |
| 5,691,713 | 11/1997 | Ishida | 340/870.01 |
| 5,727,002 | 3/1998 | Miller et al. | 371/32 |
| 5,732,216 | 3/1998 | Logan et al. | 395/200.33 |
| 5,737,495 | 4/1998 | Adams et al. | 395/615 |
| 5,751,883 | 5/1998 | Ottensen et al. | 386/27 |
| 5,867,230 | 2/1999 | Wang et al. | 348/845 |

OTHER PUBLICATIONS e mail message containing search report having several abstracts (e mail dated Apr. 29, 1996; performed Apr. 29, 1996).

RealMedia Overview, "The First Open Multimedia Streaming Platform," http://www.realuadio.com/ or e–mail radinfo@prognet.com; copyright ©Progressive Networks, 1996.

RealMedia, "Technical White Paper," http:// www.realuadio.com/ or e–mail radinfo @prognet.com; copyright ©Progressive Networks, 1996.

*Primary Examiner*—Mehmet B. Geckil
*Attorney, Agent, or Firm*—Hugh Dunlop; Joanne N. Pappas

[57] ABSTRACT

A system and device for, and method of, presenting multimedia information. In a client-server context, the invention includes a client that receives units of the multimedia information and presents the information on a presentation device. Each unit of information has an importance value assigned to it, which in an exemplary embodiment is indicative of the unit's importance in relation to the quality of the presentation. The invention includes a mechanism for characterizing the performance capabilities of the system. For example, several conventional statistics may be gathered and analyzed concurrently with the streaming operation and before it begins. The invention includes a mechanism for inferring network conditions from the characterized performance. The server may then stream the units of multimedia information to the client at a streaming rate and adapt the streaming rate of the streaming in response to the importance information and in response to the inferred network conditions.

51 Claims, 8 Drawing Sheets

SYSTEM, DEVICE, AND METHOD FOR STREAMING A MULTIMEDIA FILE

CROSS-REFERENCE TO RELATED APPLICATIONS

This application is related to the following U.S. patent applications, all of which are assigned to the assignee of this application and all of which are incorporated by reference herein:

Device, System And Method Of Real-Time Multimedia Streaming (Serial No. 08/636,417, to Qin-Fan Zhu, Manickam R.

Sridhar, and M. Vedat Eyuboglu, filed Apr., 23, 1996); and

Improved Video Encoding System And Method Ser. No. 08/711,702, to Manickam R. Sridhar and Feng Chi Wang, filed on even date herewith.).

BACKGROUND

1. Field of the Invention

The invention generally relates to real-time multimedia applications and, more particularly, to the streaming of real-time multimedia information over a communication network.

2. Discussion of Related Art

Generally speaking, multimedia applications present related media information, such as video, audio, music, etc., on a presentation device, such as a computer having a display and sound system. Some multimedia applications are highly interactive, whereas other applications are far less interactive. For example, a game is a highly interactive application in which the application must respond to many user inputs such as keyboard commands and joystick movements, whereas viewing a video clip is less interactive and may only involve start and stop commands. Moreover, multimedia applications may be directed to standalone single computer contexts, or they may be directed to distributed, network-based contexts.

At a very high level of abstraction, following the producer-consumer paradigm, any multimedia application involves producing and consuming the related multimedia information. The above examples of highly interactive and less interactive and standalone and network-based applications differ in the manner in which the information is produced and consumed and the complexity in controlling the production and consumption .

For example, in PCs and other standalone contexts, the information need only be read off a local CD Rom or the like, and thus, producing the information to the consumer involves relatively predictable characteristics and requires relatively simple control logic. In network-based contexts, on the other hand, the information must be produced over the network and is thus subject to the unpredictable characteristics and intricacies of the network: data may be lost, performance may vary over time, and so on. Consequently, the control logic may need to be relatively complicated.

In either the standalone or network-based context, consuming the information involves presenting the related information to the corresponding presentation components in a controlled manner and in real time. For example, to provide intelligible audio-video clips, the video data must be provided to a video driver and audio data must be provided to a sound card driver within specified timing tolerances to maintain intra- and inter-stream synchronism. Intra-stream synchronism means that a given stream, such as audio, is presented in synchronism within specified time relationships, in short, that the stream itself is coherent. Inter-stream synchronism means that multiple related streams are presented in synchronism with respect to each other. Concerning intra-stream synchronism, all streams, for the most part, should present data in order. However, users are more forgiving if some streams, such as video, leave out certain portions of the data than they are of other streams, such as audio, doing the same. A video stream with missing data may appear a little choppy, but an audio stream with missing data may be completely unintelligible. Concerning inter-stream synchronism, poor control will likely result in poor "lip synch," making the presentation appear and sound like a poorly dubbed movie.

In the network-based context, one simple model of producing the information involves the consuming entity to request the downloading of the multimedia information for an entire presentation from a server, storing the multimedia information. Once downloaded, the client may then consume, or present, the information. Although relatively simple to implement, this model has the disadvantage of requiring the user to wait for the downloading to complete before the presentation can begin. This delay can be considerable and is especially annoying when a user finds that he or she is only interested in a small portion of the overall presentation.

A more sophisticated model of producing information involves a server at one network site "streaming" the multimedia information over the network to a client at another site. The client begins to present the information as it arrives, rather than waiting for the entire data set to arrive before beginning presentation. This benefit of reduced delay is at the expense of increased complexity. Without the proper control, data overflow and underflow may occur, seriously degrading the quality of the presentation.

Many modern multimedia applications involve the transfer of a large amount of information, placing a considerable load on the resources of the network, server, and client. The use of network-based multimedia applications appears to be growing. As computers become more powerful and more people access network-based multimedia applications, there will be an increased demand for longer, more complicated, more flexible multimedia applications, thereby placing even larger loads and demands on the network, server, and client. The demand placed on servers by these ever-growing multimedia applications is particularly high, as individual servers are called upon to support larger numbers of simultaneous uses: it is not uncommon even today for an Internet server to handle thousands of simultaneous channels. Consequently, there is a need in the art for a device, system, and method that, among other things, can handle longer, more complicated presentations;

utilize a network's resources more efficiently; and utilize a server's and client's resources more efficiently.

SUMMARY

In short, the invention involves a new file format for organizing related multimedia information and a system and device for, and method of, using the new file format. The invention eases the management and control of multimedia presentations, having various media streams, each of a specific type, each specific type further classified by encoding type, subtype, and encoding rate. Thus, with the invention, an application may support several instances of a particular media type, with each instance having different characteristics. For example, the application may support multiple audio streams, with each stream in a different language, from which a user may select. Analogously, with the invention, the application may choose a given instance of a media stream based on the network's characteristics; for example, the application may choose an audio subtype that is encoded for a transmission rate that matches the network's characteristics. The invention reduces a server's memory and processing requirements, thus allowing a server to simultaneously service more requests and support more channels. And, the invention dynamically adapts the media's streaming rate to use the network's resources more efficiently while minimizing the effects of the adaptation on the quality of the presentation.

The invention includes a system and device for, and method of, presenting multimedia information. In a client-server context, the invention includes a client that receives units of the multimedia information and presents the information on a presentation device. Each unit of information has an importance value assigned to it, which in an exemplary embodiment is indicative of the unit's importance in relation to the quality of the presentation. The invention includes a mechanism for characterizing the performance capabilities of the system. For example, several conventional statistics may be gathered and analyzed concurrently with the streaming operation and before it begins.! The invention includes a mechanism for inferring network conditions from the characterized performance. The server may then stream the units of multimedia information to the client at a streaming rate and adapt the streaming rate of the streaming in response to the importance information and in response to the inferred network conditions.

According to one aspect of the invention, the importance information that is pre-assigned is stored with each unit of information in the file. This importance information is indicative of the unit's importance to the perceived quality of the presentation According to another aspect of the invention, the adaptation of the streaming rate includes throttling up the streaming rate if the inferred network condition indicates that there is sufficient bandwidth to receive multiple copies of a given unit of information.

According to yet another aspect of the invention, the adaptation of the streaming rate includes throttling down the streaming rate if the inferred network condition indicates that there is insufficient bandwidth to receive a given unit of information. Similarly, throttling down may occur if the inferred network condition indicates that there is network congestion.

One of the performance characteristics gathered, believed to be novel, is the characterizing of a bit rate throughput value. This may be done, for example, by determining the data rate of a communications device, such as a modem, utilized by the client computer to communicate with the server computer.

DETAILED DESCRIPTION

Figure 1:
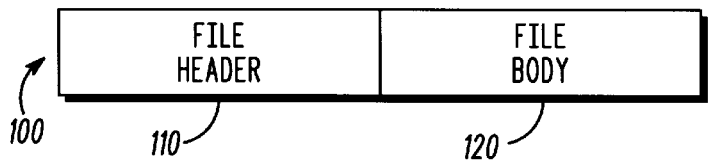
FIG. 1 is a block diagram showing the novel multimedia file at a high level of abstraction.

In short, the invention involves a new file format for organizing related multimedia information and a system and device for, and method of, using files organized according to the new format. The invention eases the management and control of multimedia presentations, having various media streams, each of a specific type, each specific type further classified by encoding type, subtype, and encoding rate. Thus, with the invention, an application may support several related audio streams, such as English and French, from which a user may select. Analogously, with the invention, the application may choose a particular instance of a media stream based on the network's characteristics; for example, the application may choose an audio stream that is encoded for a transmission rate that matches the network's characteristics. The invention reduces a server's memory and processing requirements, thus allowing a server to simultaneously service more requests and support more channels. And, the invention dynamically adapts the media's streaming rate to use the network's resources more efficiently while minimizing the effects of the adaptation on the quality of the presentation.

I. The File Format

The new file format, among other things, allows various types and subtypes of multimedia information to be organized, maintained, and used as a single file. The file format simplifies the server by not requiring the server to know, for example, which video files are related to which audio files for a given application, or to know how to locate and use related files, each with their own internal organization, corresponding method of access and processing.

The file format allows multiple instances of a single media type to be stored in the file. Multiple instances of a single media type may be desirable for supporting alternate encodings of the same media type, for example, an audio segment in multiple languages. This flexibility allows a single file to contain, in effect, multiple versions of the same presentation. Each instance corresponds to a "presentation's worth" of information for that media type. For example, with the audio media type, an instance may involve the entire soundtrack in French or the entire soundtrack encoded at a particular rate.

The file format allows media instances to be added and deleted to a file. This feature allows the file to be updated as new media types and new media segments are developed, without requiring modification of the server's or client's logic to support the newly-added instances. This flexibility makes it easier to modify, create, and maintain large, complicated multimedia presentations.

The file format allows the server to implement more flexible and powerful presentations. For example, the server could support multiple languages as various subtypes of an audio stream. In addition, the server could support multiple, expected transfer rates. For example, a video media type may be implemented as a subtyped instance having pre-packetized video data encoded for a target transfer rate of 28.8 kb/s or encoded for a target transfer rate of 14.4 kb/s.

Moreover, when properly used by a server or other application, files organized according to the new format will reduce the amount of memory and processor resources required to stream the file's contents to a client or the like. These advantages are further discussed below.

The new file format 100 is shown at a high level of abstraction in FIG. 1. The file format 100 includes a file header 110 and a file body 120. In short, the file header 110 describes the file itself and the contents of the file body 120 and includes information used to locate data in the file body. The file body 120 includes more information used to locate data in the file body as well as including the actual data used during a presentation.

Figure 2A:
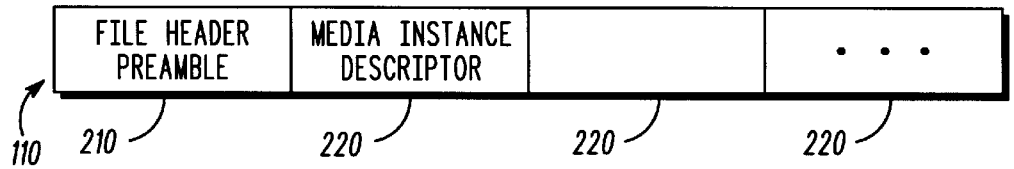
FIG. 2A is a block diagram showing the file header of the multimedia file;.
Figure 2B:
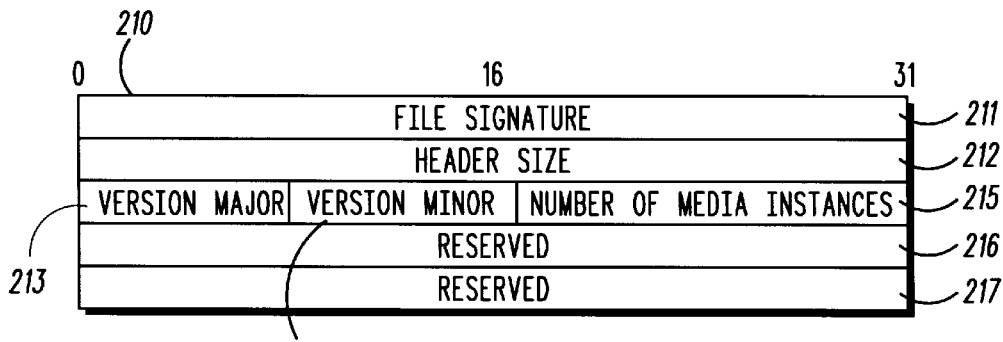
FIG. 2B is a block diagram showing the format of a file header preamble.

More specifically, the file header 110 includes a file header preamble 210 and a number of media instance descriptors 220, shown in FIG. 2A. The file header preamble 210, shown in more detail in FIG. 2B, includes a field 211 containing a file signature, a field 212 containing the size of the header, a field 213 containing the major version number, a field 214 containing the minor version number, and a field 215 containing the number of media instances in the file. (The major and minor version numbers are used by the client and the server to determine if they are compatible, for example, to determine whether they are communicating with an expectation of the same format of the file) The file header preamble 210 also includes reserved fields 216 and 217 to allow for future expansion of the preamble.

Figure 2C:
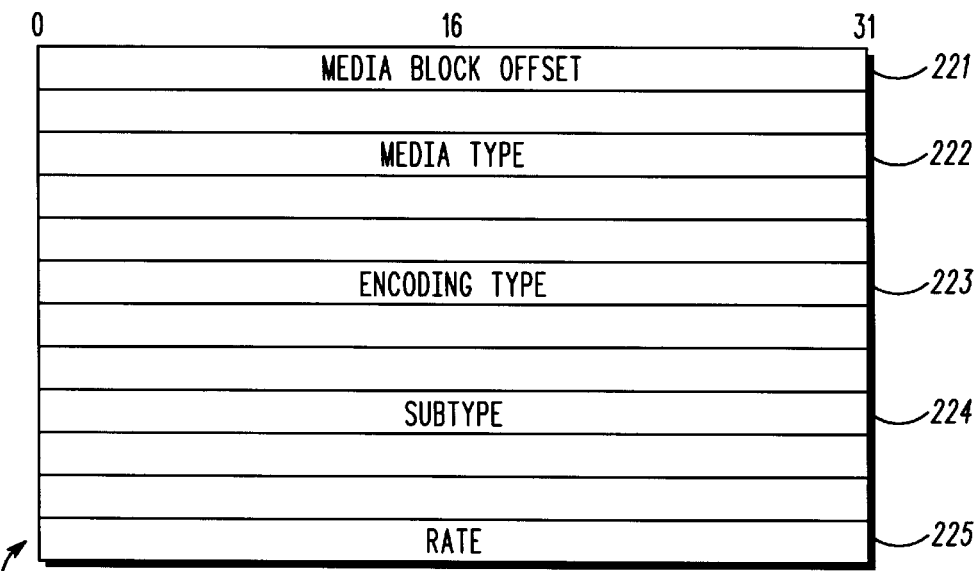
FIG. 2C is a block diagram showing the format of a media instance descriptor.

As shown in more detail in FIG. 2C, each media instance descriptor 220 includes a variety of fields 221–225 which are used to describe and identify a media instance. Some of the fields are used to describe various characteristics or attributes about the instance's data that will be presented, whereas other fields are used to locate and select the data. Field 221 indicating the offset, e.g., number of bytes, from the beginning of the body to the corresponding media block. The media instance descriptor 220 also includes a field 222 indicating the media type of the corresponding media block, for example, video, audio, MIDI, and other existing and future media types. Field 223 indicates the encoding type of the corresponding media block, for example, H.263, H.261, MPEG, G.723, MIDI, and other standard or proprietary encoding types. Field 224 indicates a corresponding subtype, for example, English audio, French audio, QCIF video, CIF video, etc. Field 225 indicates an encoding rate of the corresponding media block; for example, for video information, the encoding rate indicates the target data rate for which the video information was encoded by a video encoder, such as the video encoder described in the related U.S. patent application Improved Video Encoding System and Method", identified and incorporated above, whereas for audio information, the encoding rate might indicate one of a number of audio sampling rates.

As will be explained below, the number contained in field 215 is not necessarily the same as the number of media streams that will eventually be involved in a presentation. The file contains a number of potentially related media streams, or instances, organized according to media type, encoding type, subtype, and rate. A presentation, on the other hand, will likely involve only a subset of the available media streams, typically one instance of each of the plurality of media types. For example, a given presentation will likely involve only one of the multiple audio (language) subtyped instances that may be provided by a file organized according to the format. The same can be said for data encoded at different rates, and of course, a user may not be interested in a full compliment of media streams, e.g., the user may not be interested in receiving audio, even if it is supported by a file. Depending upon the services supported by the server (more below), the actual media types and particular instances of those media types involved in a presentation may be controlled by an end user, e.g., which language, and may also be controlled by the system, e.g., which encoded rate of audio.

Once the media types and particular instances of those media types have been determined, for example, by being selected by the user or the server, the server will construct data structures using information from the file header 110, described above, so that the server can index into and iterate over the data packets contained in the file body 120. (Indexing and iteration logic are known) The server can also use the header's information to perform revision control and other known maintenance operations, discussed below when describing an exemplary server.

Figure 3:
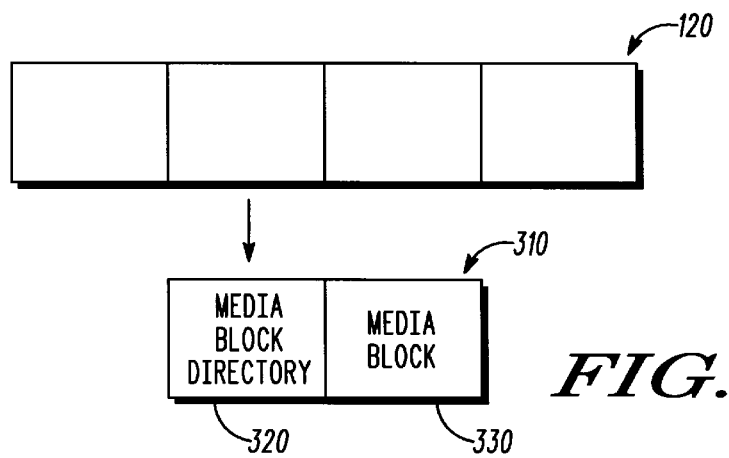
FIG. 3 is a block diagram showing the format of a media block.

The data contained in the file body 120 is organized as contiguous media blocks 310, one media block for each instance of a media type, as shown in FIG. 3. Each media block 310 includes a media block directory 320 and a media block body 330. The media block directory 320 includes information that may be used to locate information in the media block body 330, and the media block body 330 includes the actual data that will eventually be presented. This data is stored in the media block body 330 in pre-packetized form. "Pre-packetized" means that the data stored in media block body 330 is organized as discrete packets of information that can be transported without requiring any processing by the server to build the packets. An exemplary embodiment, discussed below, pre-packetizes the data so that it can be applied directly to the User Datagram Protocol (UDP) layer, which is part of the TCP/IP protocol suite. (UDP and TCP/IP are known).

The pre-packetization process is media instance specific. For example, the G.723 audio encoding standard encodes an audio stream into a stream of blocks, in which each block represents 30 milliseconds of audio information. One method of pre-packetizing the audio would be to form an audio packet for each G.723 block. A potentially more efficient method, however, merges many g.723 blocks into a packet, for example, 32 G.723 blocks to form an audio packet representing 960 milliseconds' worth of audio information.

Pre-packetizing video information, on the other hand, may benefit from dividing, rather than merging, presentation units. For example, under the H.263 video encoding standard, video information is encoded as a sequence of video frames (i.e., a frame being a presentation unit). Although a video packet may be formed to correspond to a single video frame, or presentation unit, advantages may be attained by dividing the presentation unit into several packets. In this fashion, a large video frame may be divided into several packets so that each video packet is limited to a predetermined, maximum packet size.

By pre-packetizing the data, an appropriately designed server's processor load may be reduced by alleviating the processor from having to perform certain tasks such as constructing packets on-the-fly from the media information. With the invention, the server can simply read a packet from the file and pass it to a UDP layer of the protocol stack via a standard interface.

In addition, by pre-packetizing the data, an appropriately designed server's memory requirements are by alleviating the server from having to keep recently transmitted packets available in a "packet window" in memory. Packet windows are conventionally used to hold recently-transmitted network packets in case they need to be retransmitted because they were lost in the network. The protocol being used dictates the required size of a packet window, but it is not uncommon in modern systems to have windows that require on the order of 100 kb of memory (RAM). Given that each network channel requires a corresponding packet window and that it is not uncommon for current high-demand Internet servers to support upwards of 5,000 simultaneous channels (with foreseeable demand growing to over 20,000 simultaneous channels in the near future), 512 Megabytes of expensive high-speed memory are needed just to support packet windowing. This requirement precludes many modern personal computers, and other small systems, from operating as a server. In contrast, the invention obviates the need for the packet windows and thus allows smaller, lower-cost systems to potentially operate as servers.

The organization of a generic media block 310 is shown in FIGS. 4A–E and defines the basic template for a media block. In short, the generic media block format describes certain features common to all media types and instances. As will be described below, specific media types, such as video, audio, and MIDI may need to "supplement" the generic template.

Figure 4A:
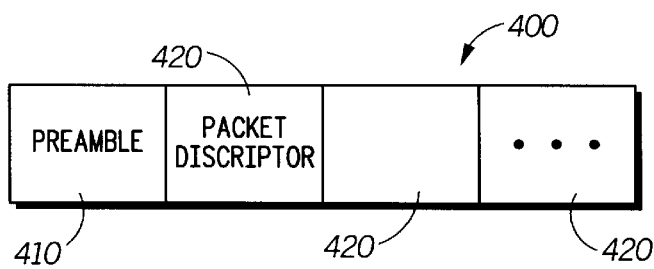
FIG. 4A is a block diagram showing a generic media block directory format.
Figure 4B:
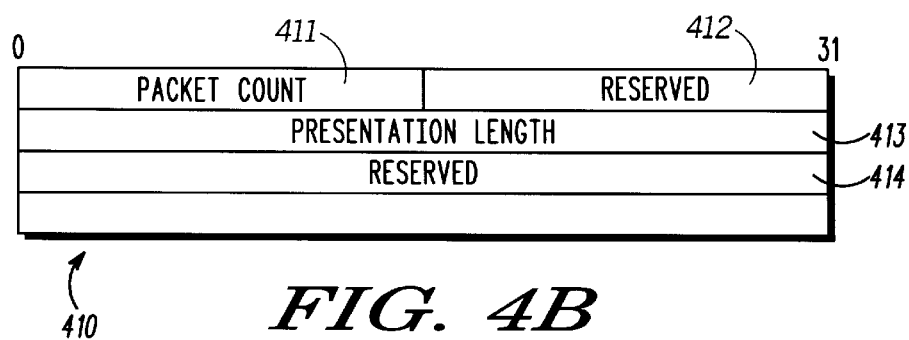
FIG. 4B is a block diagram showing the format of a generic directory preamble.

A generic media block directory 400, shown in FIG. 4A, includes a directory preamble 410 and a number of packet descriptors 420. The directory preamble 410, shown in more detail in FIG. 4B, includes a packet count field 411, indicating the number of packets contained in the media block body and a presentation length field 413 indicating the total time duration of the presentation. A number of reserved fields 412 and 414 provide additional storage for media instance specific information (more below).

Figure 4C:
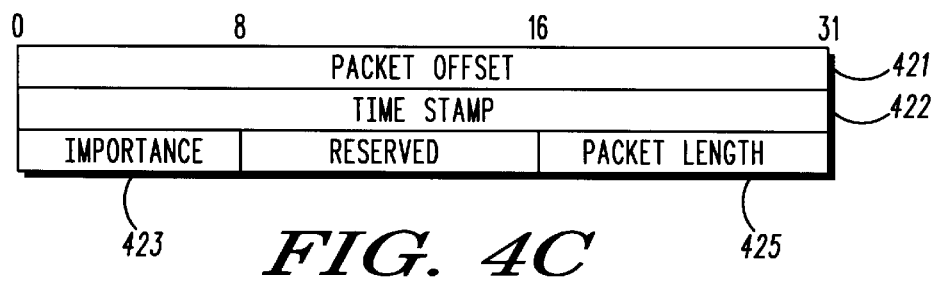
FIG. 4C is a block diagram showing the format of a generic packet descriptor.

A packet descriptor 420, shown in FIG. 4C, describes a single packet in the media block body. There is a one-to-one correspondence between packet descriptors 420 in the media block directory and packets in the media block body. Each packet descriptor 420 includes a packet offset field 421 indicating the offset, e.g. bytes, from the start of the media block to the corresponding packet, a time stamp field 422 indicating the start time for the packet relative to the start time of the presentation, an importance field 423 indicating the relative importance of the corresponding packet (more below), and a packet length field 425 indicating the length, e.g. bytes, of the corresponding packet.

Figure 4D:
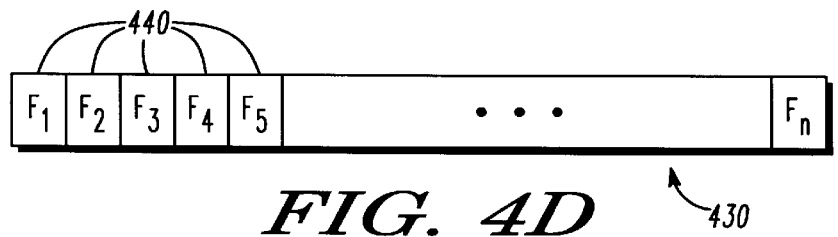
FIG. 4D is a block diagram showing the format of a generic media block body.

A generic media block body 430, shown in FIG. 4D, includes a number of packets 440. This number represents the number of packets in the stream, or instance.

Figure 4E:
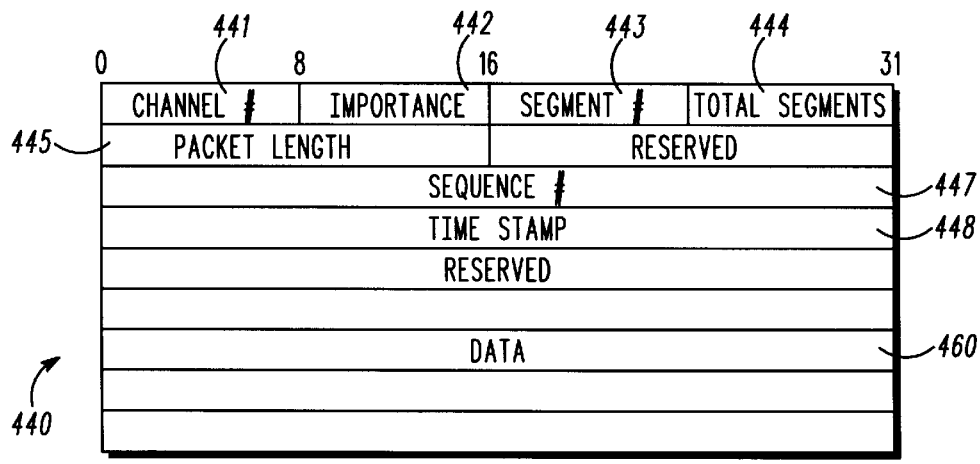
FIG. 4E is a block diagram showing the format of a generic packet.

A packet 440, shown in more detail in FIG. 4E, includes a channel number field 441, which is reserved for a currently undefined future use, and an importance field 442 indicating the relative importance of the packet to the perceived quality of the presentation (more below). Each packet 440 also includes fields 443–444 that may be used for segmentation and reassembly (SAR) of presentation units. As outlined above, depending on the media instance and other circumstances, advantages may be attained by dividing video frames into multiple packets. To accomplish this, field 443 may be used to indicate the sequence number of the given packet relative to the multiple packets composing the presentation unit, e.g., video frame. A total segments field 444 indicates the total number of segments.

The packet 440 further includes a packet length field 445 indicating the number of bytes of data contained in the packet, a sequence number field 447 which is reserved for a currently undefined future use, a time stamp field 448 indicating the start time for the packet relative to the start of the presentation, and a data field 460 containing the media data that will be eventually presented. This media data is encoded in a predetermined format, according to the media type, encoding type, subtype, and rate (see FIG. 2C); the encoding format may be standardized, in the process of being standardized, or proprietary. A reserved field 449 provides additional storage for media type specific information.

Each packet, like its descriptor, includes pre-assigned importance information, indicative of the relative importance of the packet with respect to the quality of the eventual presentation. As will be explained below, some media frames are highly important; their absence from the presentation may make it unintelligible. Other frames are less important; their absence may be barely noticed or may be "concealable." ("concealing" is known)

As will be described below when discussing an exemplary server, importance information may be used by both the server and the client. For example, the server may use the information to intelligently adapt its streaming characteristics to better utilize the network's resources. The server may "drop" packets from being sent, when needed, or send multiple copies of packets, if beneficial. On the other hand, the client may use the information to intelligently maintain synchronism. The client may drop relatively unimportant video packets to maintain synchronism with the audio stream being presented.

Regarding the format of specific media blocks, video information may be formed into a media block, having data in accordance with the H.263 format. H.263 specifies that video streams will include "I" frames, "P" frames, and "PB" frames. The "I" frames are independent frames in that they represent a complete image, with no dependencies on the prior history of the video image. Therefore, I frames can be considered as specifying the "state" of a picture. The "P" and "PB" frames, on the other hand, specify the changes to a current picture, as defined by an I frame and intervening P and PB frames. Therefore, P and PB frames are akin to "state changes," rather than states. A typical video stream would involve an I stream followed by P and PB frames, followed by more I, P, and PB frames. The processing of I, P, and PB frames is known.

Figure 5:
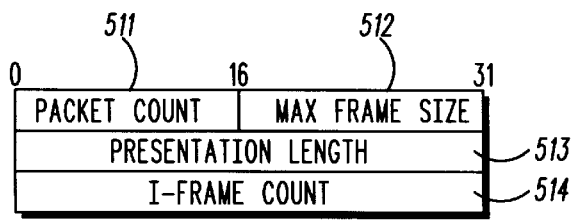
FIG. 5 is a block diagram showing the format of an H.263 media block.

The format of the H.263 media block is generally the same as the generic media block, described above with reference to FIGS. 3–4E. However, the H.263 media block does supplement the generic format in certain areas. The H.263 directory preamble 500, shown in FIG. 5, for example, differs from the generic template by including a field 512 indicating the maximum frame size in the presentation and by including a field 514 indicating the number of I-frames in the H.263 video stream, or instance.

Audio information may be formed into a media block, having data in accordance with the G.723 format. The format of the H.263 media block is identical to the generic media block, and contains no additional information.

Figure 6:
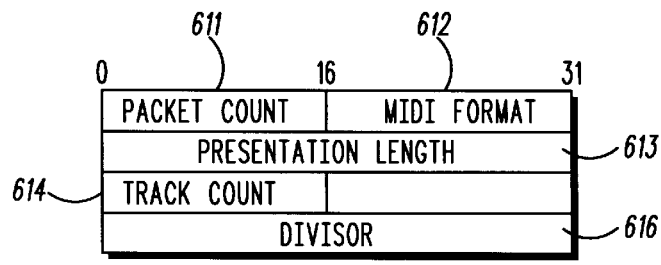
FIG. 6 is a block diagram showing the format of a MIDI media block preamble.
Figure 7:
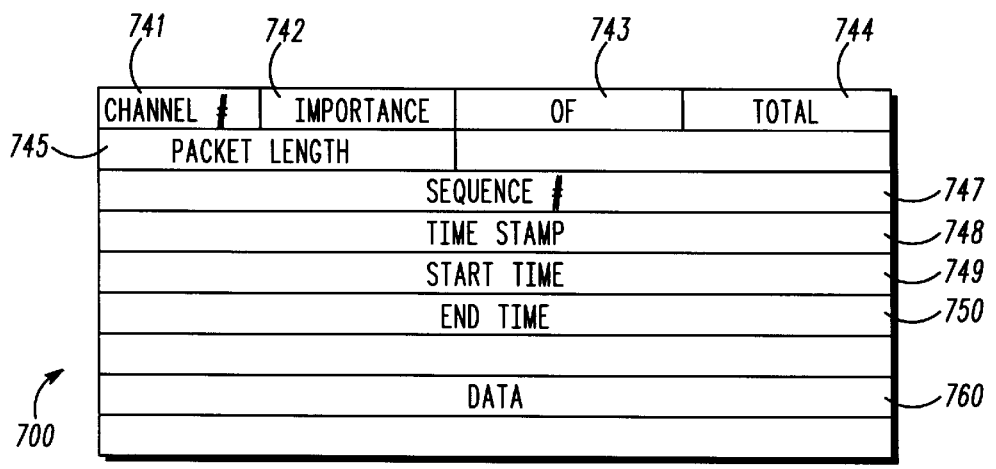
FIG. 7 is a block diagram showing the format of a MIDI packet.

MIDI information may be formed into a media block, having data in accordance with a MIDI format. The format of a MIDI media block is generally the same as the generic media block. However, the MIDI media block does supplement the generic format in certain areas. The MIDI directory preamble 600, shown in FIG. 6, for example, differs from the generic template by including a field 612 indicating one of a plurality of MIDI formats, a field 614 indicating the number of tracks contained in the MIDI stream, and a divisor field 616 used to specify the tempo of the MIDI stream. The MIDI packet 700, shown in FIG. 7, differs from the generic packet 440 (see FIG. 4E) by including a field 749 indicating the start time of the MIDI packet relative to the start of the presentation and by including a field 750 indicating the relative end time of the MIDI packet.

II. Creating Files According to the Novel Format

Figure 8:
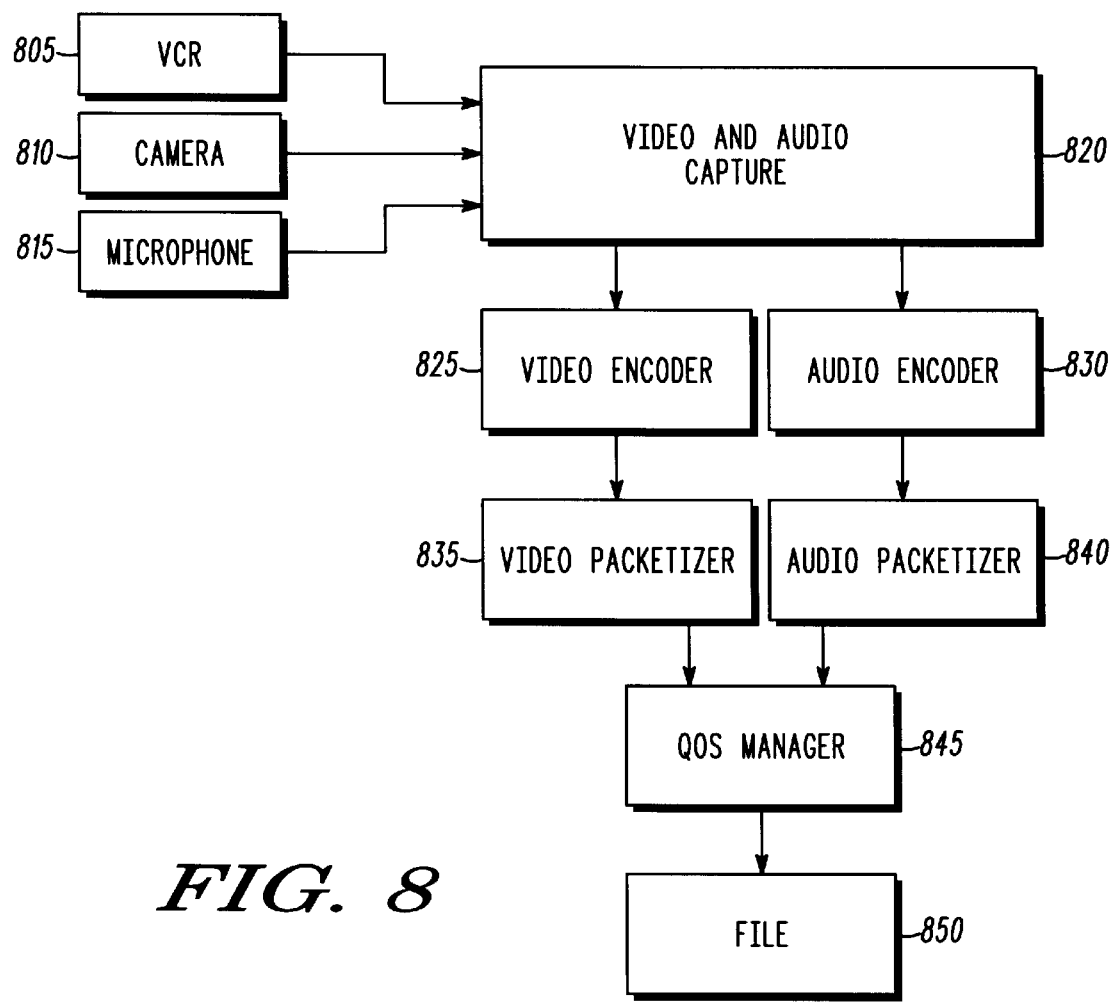
FIG. 8 is a block diagram showing a system for creating a multimedia file.

It is expected that developers will create multimedia files in the format described above using various methods and systems. FIG. 8 shows but one simple example. For simplicity, the exemplary system 800 creates a file 850 with an audio stream(s) and video stream(s) only, but skilled artisans will appreciate the relevance of the teachings to other media types, e.g., MIDI, etc.

Media components, such as VCR 805, camera 810, and microphone 815, generate media information, which is received by a sound and video capture system 820, for example, available from AVID Technologies or Adobe, Inc. The capture system 820 may store the captured audio and video information in a proprietary, but known, format.

The captured information is applied to video encoder 825 and audio encoder 830, which encode the captured information into frames according to predetermined formats, such as H.263 for video and G.723 for audio. For example, the video encoder 825 may use software-based logic to do the encoding from the format of the capture system 820 into the predetermined format, e.g., H.263. An exemplary encoder is described in the U.S. patent application entitled "Improved Video Encoding System and Method", identified and incorporated above. Analogous software-based processing could be applied to the audio information, originating from system 820.

The encoded video, originating from encoder 825, and the encoded audio, originating from encoder 830, are applied to respective packetizers 835 and 840. Each packetizer arranges the encoded data in pre-packetized form with the necessary packet information, e.g., importance, packet length, and time stamp (see FIG. 4E). For the most part, each video frame will have its own corresponding packet, such as a UDP packet, but as described above with regard to FIG. 4E, a frame may be divided up into several packets, for example, if the video packet is very large. Analogous packet processing is applied to the audio frames.

The output of the packetizer is written to file 850, for example, on a CD ROM, such that each media type uses a contiguous portion of a body 120 to contain the media block. The header 110, including the preamble 210 and media instance descriptors 220 (see FIG. 2) are programmed with the values, described above, as part of the final assembly of the file 850. Much of the information, such as the importance information, is supplied by the encoders 825 and 830.

The multimedia file 850 is easily modified to add or delete media blocks, for example, to add additional languages, data rates, or background music. To add a media block, the file header is edited to include a new media instance descriptor, and the media block is added into the file body. To delete a media block, the file header is edited to delete the corresponding media instance descriptor, and the media block is removed from the file body.

III. Overview of Device and System for, and Method of, Presenting Multimedia Information In addition to the above, the invention provides a device and system for, and method of, presenting the multimedia information in a manner that efficiently uses network bandwidth and that efficiently uses a server's processor and memory resources. As will be explained below, the device, system, and method allow a server to support more simultaneous channels and allow a server to intelligently and dynamically adapt its streaming characteristics. More specifically, by using the pre-packetized information, the server needs less processor and memory resources to support a channel vis-á-vis conventional arrangements, and thus, a server having a given amount of processor and memory resources can support more channels by using the invention. In addition, by using the importance information pre-assigned to each packet, a server can dynamically adapt its streaming characteristic to send multiple copies of a packet if the situation warrants, or to eliminate certain packets from being sent if the situation warrants.

Figure 9:
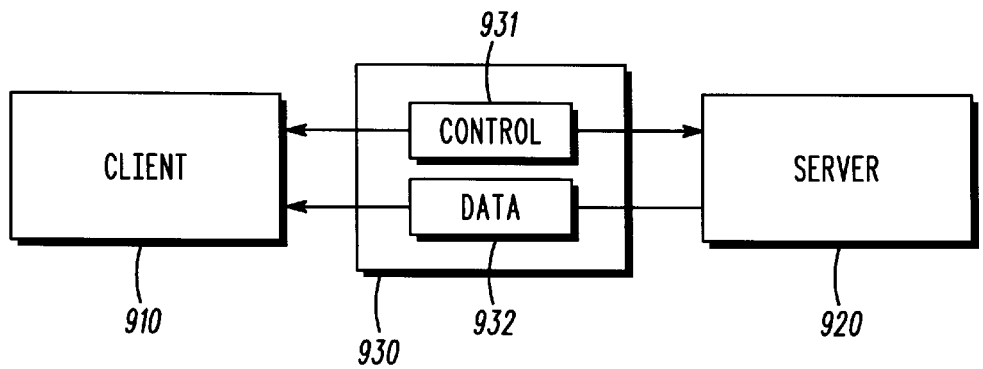
FIG. 9 is a block diagram showing a system embodying the invention in a client-server context.

A high-level architectural diagram of a system, embodying the invention in a client-server context, is shown in FIG. 9. In this context, a client 910 communicates with a server 920 via a communication network 930. The client may, for example, include a PC, and the server may include a UNIX-based workstation, minicomputer, or the like. The communication network 930 may utilize a variety of known physical mediums and protocols, such as modem links, LANs, using the TCP/IP suite or the like. The communications network 930 allows control information 931 and data 932 to be exchanged between the client 910 and the server 920.

IV. A More Specific Example of the Device, System, and Method

One specific example of a client-server context in which the invention may be practiced is the Internet. In the Internet context, as will be appreciated by users familiar with the Internet, the client 910 might include a known browser application for navigating access to various severs 920 connected to the Internet. Each server might use known web server applications to display web pages, which might include text and graphical icons, among other things. Some of the icons might be "active" in which case clicking the icon would cause a video clip to be presented to the client. The mechanisms for causing the presentation of the video clip are discussed below.

Figure 10:
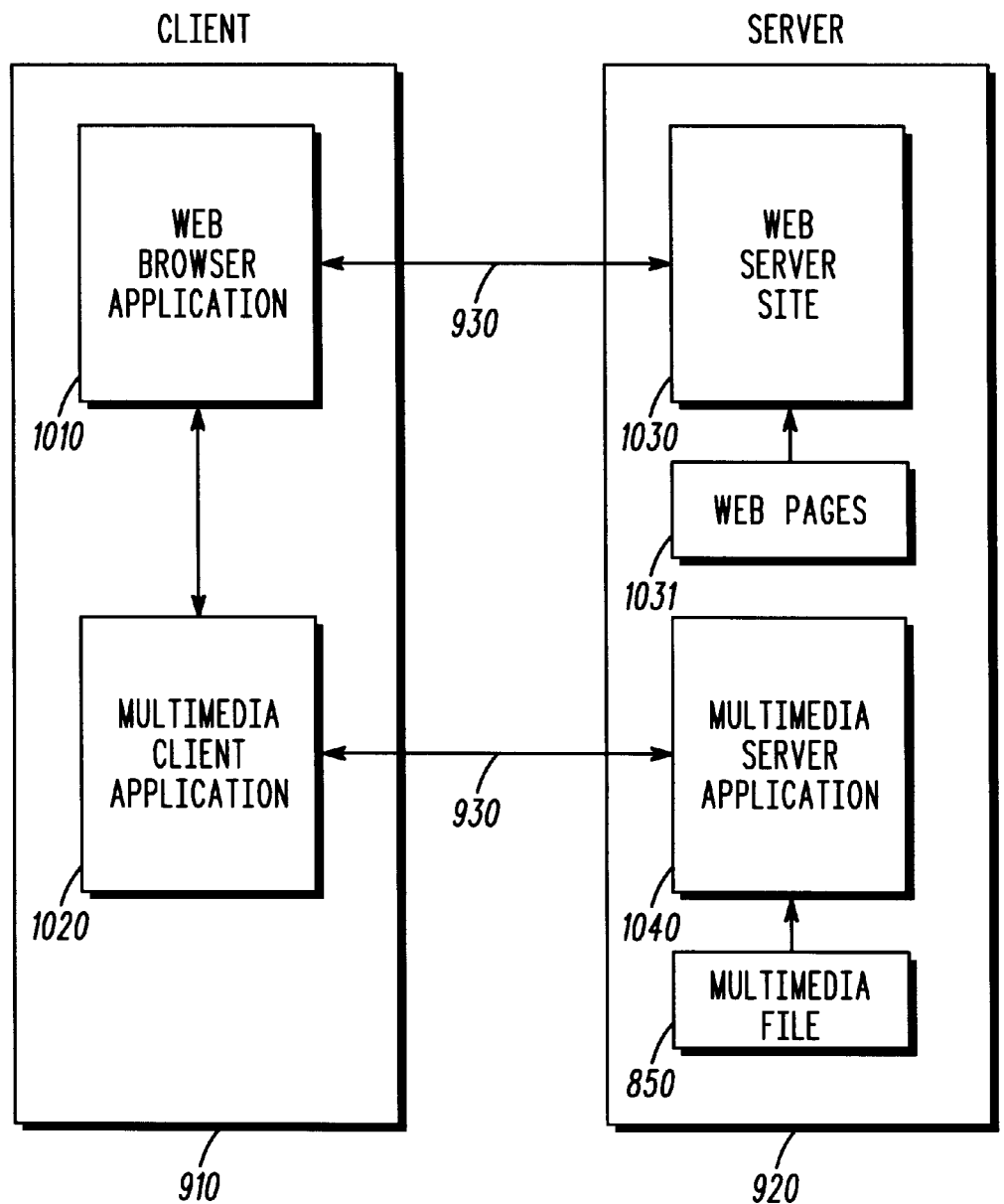
FIG. 10 is a block diagram showing the client and server components of the system.

An exemplary arrangement of using the invention in the Internet context is shown in FIG. 10. The client 910 includes conventional browser application 1010, and the server 920 includes conventional web server application 1030 and web pages 1031, all of which will not be discussed in detail because they are known. The web browser application 1010 cooperates with novel multimedia client application 1020 to initiate the processing of file 850, described above. In turn, multimedia client application 1020 cooperates with novel multimedia server application 1040 to produce the multimedia file 850 from the server. The interaction and cooperation of the above entities are further described below.

a. Set Up

The web browser application and the web server application interact through a known standard interface, which will be described briefly. The web browser application is used to view web pages on various servers in the network. A web page may allow access to certain files stored on the server, including multimedia files such as file 850 (see FIG. 8). To view a file, the web browser requests a Universal Resource Locator (URL) from the web server application, and the web server application responds with a message which includes a MIME type which specifies the location and type of the file. Based on the file type, the web browser application may need to invoke a "helper" application, which is used specifically to handle files having the specified file type. In the case of multimedia file 850, the web browser application invokes the novel multimedia client application, which initiates an interaction with the novel multimedia server application to produce the multimedia file.

Figure 11:
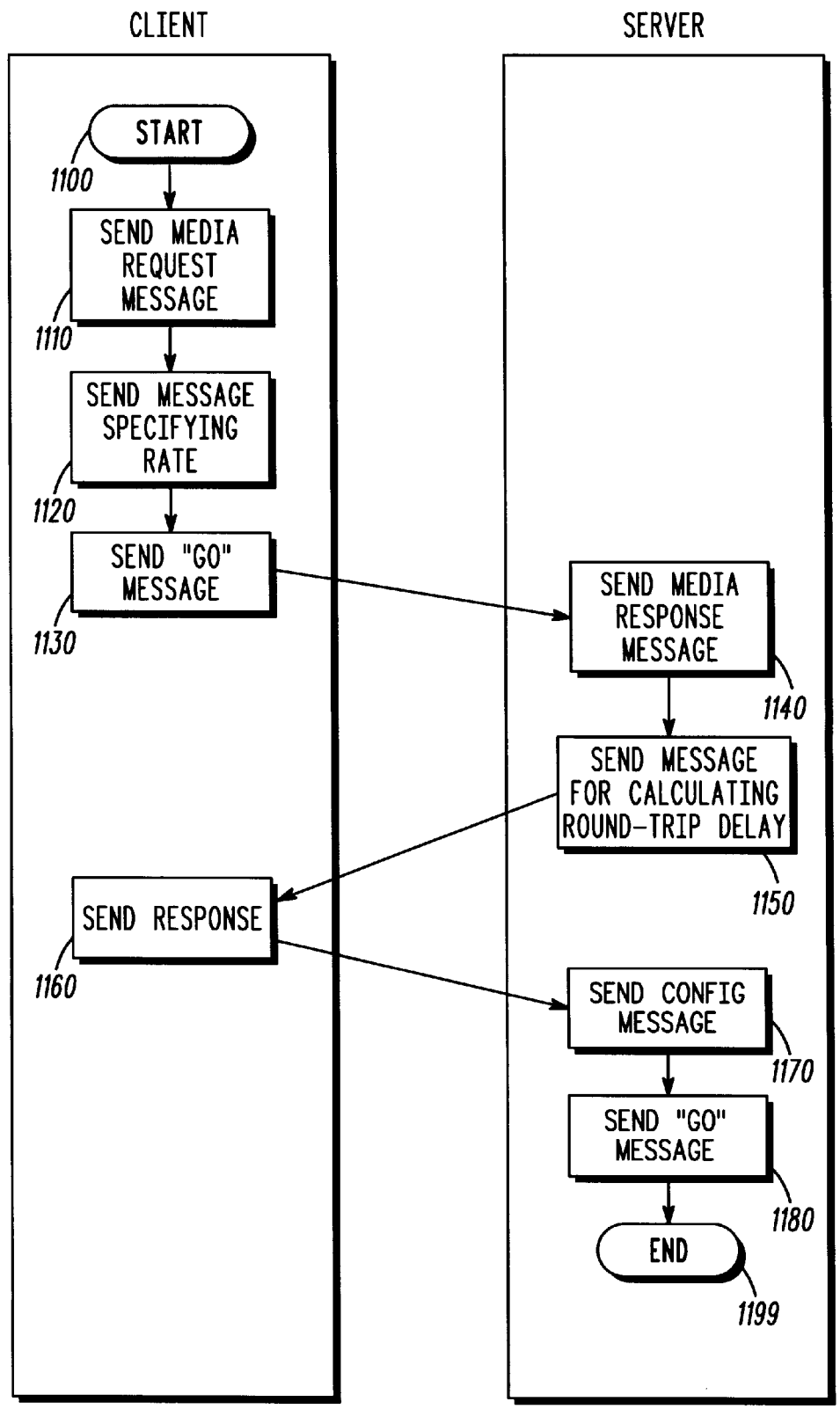
FIG. 11 is a flow diagram showing an initial interaction between the client and the server.

An exemplary initial interaction between the multimedia client application 1020 and the multimedia server application 1040 is described below with reference to FIG. 11. The interaction begins in step 1100 and proceeds to step 1110, where the multimedia client application 1020 sends a media request message to the multimedia server application 1040 specifying the desired media types to be produced, and specifying a version number of the multimedia client application and a port number to which the multimedia server application should direct communication. In step 1120, the multimedia client application 1020 sends a message to the multimedia server application 1040 specifying a desired rate of transmission. The desired rate of transmission may be determined by the client, for example, by determining the communication rate of an attached communication device such as a modem (more below). The interaction then proceeds to step 1130, where the multimedia client application 1020 sends a "go" message to the server application 1040, informing the multimedia server application that the initial client messages have been sent, and therefore allowing the server to determine whether or not all messages were received.

Upon receipt of the "go" message, the interaction proceeds to step 1140, where the multimedia server application 1040 sends a media response message to the multimedia client application 1020 specifying, among other things, the time of day as determined by a reference clock in the server or network. In step 1150, the multimedia server application 1040 sends a message to the multimedia client application, which immediate responds in step 1160 with another message. The server application 1040 uses the above "echo" to calculate a round-trip delay of the network. In step 1170, the multimedia server application 1040 sends a configuration message to the multimedia client application 1020 specifying, among other things, the sizes and relationships of the information to be produced. The multimedia client application 1020 uses the configuration information to control its consumption of the information produced, or streamed, by the server. Finally, in step 1180, the multimedia server application 1040 sends a "go" message to the client application 1020, indicating the end of the initial interaction. The interaction ends in step 1199, and the server is ready to begin streaming the media data from the file.

b. Streaming

In an exemplary embodiment, the streaming process is performed using the UDP transport protocol of the TCP/IP protocol suite. The UDP protocol is an "unreliable protocol" in that it assigns responsibility of reliable transmission to higher layers. Thus, the client logic and the server logic are responsible for detecting lost packets and the like and performing the appropriate action. This situation is unlike other transport protocols such as TCP in which detection of lost packets and responding to such detection is handled by the transport and lower layers.

Figure 12:
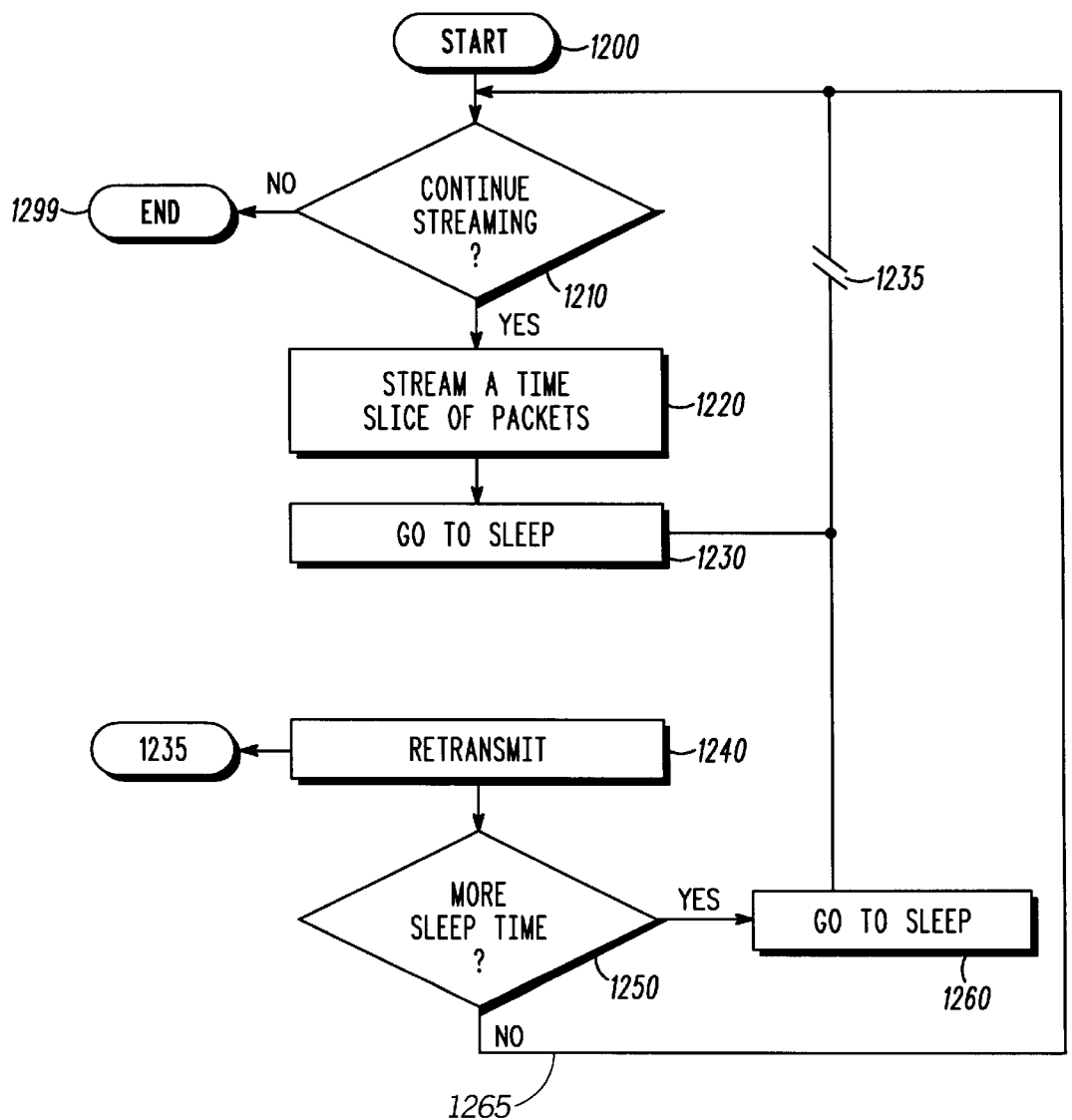
FIG. 12 is a flow diagram showing the streaming logic of the server.

The streaming logic of the server is shown at a high level of abstraction in FIG. 12. The logic starts at step 1200 and proceeds to step 1210 where it is determined whether streaming should continue. This step includes determining whether all of the packets for the requested presentation have already been streamed, whether an error has occurred, whether insufficient bandwidth exists to make continued presentation impractical, whether the user has requested the presentation to stop, whether the user has disconnected from the server, and the like. If streaming is to stop, the logic proceeds to step 1299, which ends the flow. If streaming is to continue, the logic streams a time-slice's worth of packets in step 1220. The actual logic of this step is described below.

After streaming a time-slice's worth of the packets in step 1220, the logic proceeds to step 1230 where the logic requests to go to sleep, or go idle, for a time quanta corresponding to the streaming rate. For example, if the logic is streaming audio to correspond to 960 ms slices of presentation, step 1220 will stream 960 ms worth of information, and step 1230 will request to go to sleep until it is time to stream another 960 ms worth of information. Break 1235 indicates that a break in the flow of control from step 1230 back to step 1210 may occur (more below). Assuming no break in the flow, the above logic will continue to loop and stream media packets, until one of the conditions, discussed above with regard to step 1210, is met.

As alluded to above, modern networks lose packets for various reasons. If the client detects a lost packet it may send to the server a retransmission request for the missing packet. Given that the exemplary embodiment uses UDP, this retransmission request is handled by the server logic 1040, rather than the lower layers of the protocol.

In response to a retransmission request, the logic 1040 will break at point 1235 and proceed to step 1240 which will retransmit the packet. This logic, like the logic of step 1220, is discussed below. The logic then proceeds to step 1250 which determines whether there is more time during which the logic should remain asleep. If so, the logic proceeds to step 1260, where the logic goes back to sleep for the remaining quanta set in step 1230. If not, the logic proceeds directly to step 1210 to continue streaming.

The streaming and retransmit logic of steps 1220 and 1240 are described below. A few general words are warranted before the detailed discussion. First, the streaming and retransmit steps may determine not to transmit certain packets at all. Second, the streaming and retransmit logic dynamically adapt the streaming characteristics of the server logic by either eliminating certain packets from being transmitted, or by sending multiple copies of other packets to increase the probability that the client will receive a complete sequence of packets. This dynamic adaptation is based on information contained in the packets and their descriptors and on network statistics gathered before and during the streaming operation. More specifically, the statistics are used to create "inferences" of the network state, which are used by the logic, described below, to adapt its behavior.

The server logic, as a general matter, indexes into and iterates over the various streams involved in the presentation. (Indexing and iteration are known) When retransmission is involved, the server logic indexes into the file to select the appropriate packets, while maintaining the iteration pointers for the normal streaming loop, i.e., steps 1210–1235 (see FIG. 12).

The presentation is divided into time quanta, which is typically dictated by the audio presentation rate and quanta, e.g., 960 ms. The server logic selects the appropriate packets, using indexing and iteration, from the file containing the various streams of the presentation. An exemplary embodiment selects the packets to be transmitted by comparing a clock value maintained by the server logic and in rough synchronism with the client with the time stamps 422 (see FIG. 4c) corresponding to the packetized data. Alternative arrangements include selecting the related packets based on a ratio relating the various streams; for example, several audio packets may correspond to a single video packet. Similarly, if other file organizations are used, for example, pre-interleaved audio and video, the server logic would select the appropriate segments.

Once the next packets to potentially send are identified, the logic determines whether they should be sent and, if so, how many copies should be sent. As outlined above, this is determined on statistic-based inferences (more below) and upon pre-assigned importance fields of the packets. An exemplary embodiment uses the number 1 for highest importance packets, with higher numbers corresponding to lower importance. As discussed above, these importance fields are assigned during the creation of the file, for example, with the encoder outlined above. Some encodings that are expected to be followed by all implementations, and which are followed by the exemplary embodiment, are that audio packets and I frames of video will be assigned an importance of 1, i.e., highest priority. In this fashion, as will be evident from the description below of the detailed logic of FIG. 13, these packets will always be transmitted and retransmitted when requested.

The logic of FIG. 13, described below, utilizes statistics gathered on the network. An exemplary embodiment implements the statistics gathering function in the client 910, because it will be the only entity capable of gathering certain statistics. If a different set of statistics is utilized in other embodiments, it may be beneficial to place the responsibility of gathering statistics with the server. Moreover, either the client 910 or the server 930 could perform the analysis on the statistic to create inferences or the like. In the former case, the client would gather and analyze the statistics and send the inferences to the server as control packets for use by the logic of FIG. 13. In the latter case, the client would send the statistics to the server, which would then analyze the statistics to create the inferences used by the logic of FIG. 13.

Figure 13:
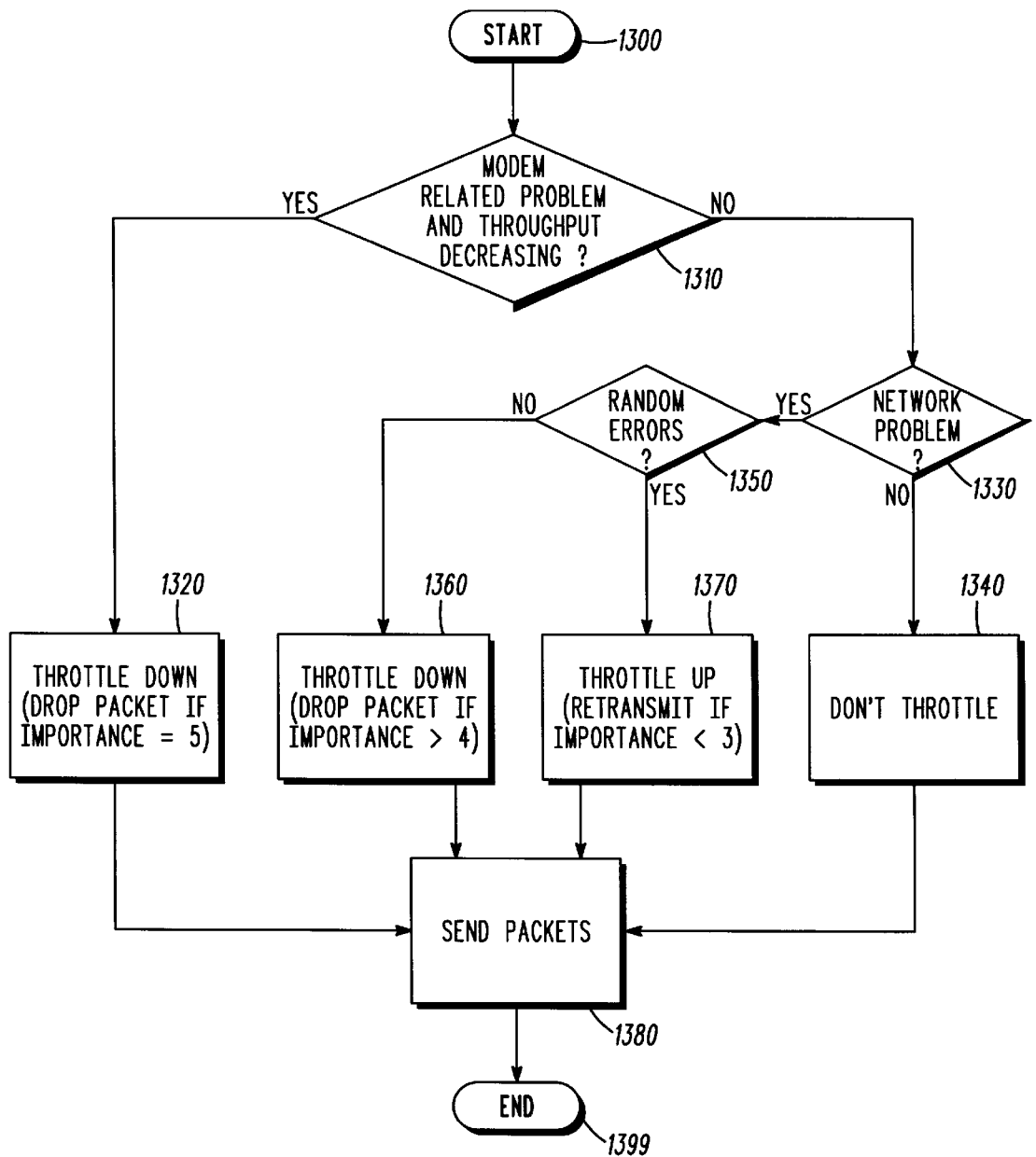
FIG. 13 is a flow diagram showing the retransmit logic of the server.

The currently envisioned set of statistics necessary to create the inferences used by the logic of FIG. 13 include the following:

1. bit rate throughput;
2. network jitter;
3. round-trip delay; and
4. percentage and distribution of packet loss.

Statistics 2–4 may be obtained with conventional techniques. Consequently, the gathering of these statistics are not discussed.

Statistic 1, however, needs to implement novel functionality as not all communication devices, e.g., certain model modems, are capable of providing these statistics during the streaming operation. An exemplary client determines throughput by monitoring and analyzing UART interrupts to determine, or infer, the modem's throughput measured as a bit rate.

As outlined above, the transmission and retransmission steps of FIG. 12 are highly abstracted. The detailed logic of these steps is described with reference to FIG. 13.

The logic begins at step 1300 and proceeds to step 1310, where an inference is checked to see if there is a modem or similarly related network performance problem. This inference is created from a detected decrease in throughput (e.g., bit rate) without a corresponding detection of significant packet loss. If there is such a problem, the logic proceeds to step 1320 where a "throttle down" operation is performed, which sets a flag indicating that a packet with importance fields equal to 5 should not be sent, or more specifically that a packet whose descriptor has an importance field of 5 should not be sent. As stated above, the assignment of fields depends on the encoding of the file, but some examples of expected packets having assignments equal to 5 include the last P or PB frames immediately before an I frame of video in a video stream. These frames are relatively less important because the following I frame will reset the state and there are no intervening states depending on these P frames.

If there is no modem or analogous problem in step 1310, the logic proceeds to step 1330 to determine if there is a network-based problem. This inference is created from detecting a significant packet loss. If there is no network-based problem, the logic proceeds to step 1340, which indicates that no throttling should occur, in short, that the network is performing adequately and that the streaming characteristics should be normal and not modified.

If there is a network problem in step 1330, the logic proceeds to step 1350 to determine whether or not the network problem involved random packet loss. If not, meaning that the packet loss involved a significant number of contiguous or nearly-contiguous packets in a small time frame, the inference is that the network is experiencing congestion, and the logic proceeds to step 1360, where a throttle down operation is performed to set a flag that packets with importance 4 or higher should not be sent.

If step 1350 indicates that the problem is random packet loss, the logic proceeds to step 1370, where a "throttle up" operation is performed if the statistics indicate that the network has available bandwidth. The available bandwidth is determined as part of the initial characterization of the network, discussed above with regard to FIG. 11B and which may be continually updated as part of the concurrent network characterization. More particularly, flags will be set to indicate that packets having importance less than 3 should be sent multiple times, e.g., in duplicate.

Steps 1320, 1340, 1360, and 1370, then proceed to step 1380 which sends the time quanta's worth of packets, discussed above, in consideration of the various flags set during throttle up and down steps. The logic then ends in step 1399.

The throttle down operations eliminate certain packets from being transmitted or retransmitted. In short, the underlying philosophy is that, in these situations, sending the packet will be to no avail or will exacerbate the detected and inferred problem. For example, if there is low throughput because of a modem problem, it does not make sense to send all of the packets because the client will likely not receive them in sufficient time for synchronized presentation.

Moreover, if the network is congested or the like, resending packets will only increase the congestion and worsen performance.

The throttle up operations transmit, or retransmit, certain packets if bandwidth is available. In short, the underlying philosophy is that, if the network resources are available, then they should be utilized to increase the likelihood that the presentation will include more of the media information (i.e., less likely to drop packets for synchronization operations at the client's end).

In both cases, the throttling is performed based on the importance information in the packet, which as outlined above indicates the importance of the packet to the quality of the presentation. Thus, less important packets are eliminated if the situation dictates, and more important packets are repeated if the situation dictates. The underlying effect is that the streaming characteristics are dynamically adapted in consideration of the importance of the information to the quality of the presentation.

Skilled artisans will appreciate that the assignment of importance fields may change and that other inferences than those discussed above are easily incorporated into the above logic. Moreover, the logic may also be adapted to dynamically change a streaming subtype if the performance situation warrants.

Skilled artisans will also appreciate that the above architecture may easily incorporate special effects processing, the logic of which will be evident, given the above description. For example, the server may provide fast forward and reverse functions. In such cases, the streaming logic, for example, could consider I frames only and ignore the P and PB frames.

Skilled artisans will also appreciate that, although the file was particularly discussed in relation to UDP-ready packets, the invention is applicable to other protocols, other layers than transport, and other segmentations of information, e.g., fixed size cells.

Skilled artisans will also appreciate that, although the media blocks were described as a contiguous arrangement, the invention is applicable to a single media block containing multiple media types arranged in a pre-interleaved format.

Skilled artisans will also appreciate that, although the file format was discussed in which media units, such as large I frames, are sub-divided, the invention is also applicable to merging smaller frames into larger packets.

Skilled artisans will also appreciate that, although the characterization of the network was discussed as a general characterization, the invention is also applicable to characterizing the network on a channel-by-channel basis and by testing the network with a test audio stream and video stream, for example.

The present invention may be embodied in other specific forms without departing from its spirit or essential characteristics. the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for presenting streaming multimedia information of a multimedia file comprising a plurality of units of information, comprising:

A) a client for receiving units of the multimedia information and presenting the information on a presentation device as it is received, without waiting for the entire file to be received before beginning presentation;

B) means for assigning importance information to individual units of the multimedia information;

C) means for characterizing the performance capabilities of the system;

D) means for inferring network conditions from said characterizing means; and

E) a server for streaming the units of multimedia information to the client at a streaming rate, the server including adaptation means for adapting the streaming rate of the streaming in response to said importance information and in response to said inferred network conditions.

2. The system of claim 1 wherein the client means is a client computer at a first network site and the server means is a server computer at a second network site and wherein the server means streams the information over a computer network connecting the client and server computers.

3. The system of claim 2 wherein the client and server computers communicate over the network in accordance with the UDP transport protocol.

4. The system of claim 1 wherein the multimedia information is recorded as a file on a non-volatile storage.

5. The system of claim 4 wherein the means for assigining the importance information comprises means for storing a pre-assigned importance value from a plurality of importance values to each unit of multimedia information in the file.

6. The system of claim 1 wherein the adaptation means includes means for throttling up the streaming rate if the inferred network condition indicates that there is sufficient bandwidth to receive multiple copies of a given unit of information.

7. The system of claim 1 wherein the adaptation means includes means for throttling down the streaming rate if the inferred network condition indicates that there is insufficient bandwidth to receive a given unit of information.

8. The system of claim 1 wherein the adaptation means includes means for throttling down the streaming rate if the inferred network condition indicates that there is network congestion.

9. The system of claim 1 wherein the importance information is indicative of the unit's importance to the perceived quality of the presentation.

10. The system of claim 1 wherein the means for characterizing performs an initial characterization of the system before the server begins streaming the units and wherein the adaption means is responsive to the intial characterization to select an initial streaming rate.

11. The system of claim 1 wherein the means for characterizing performs characterization concurrently with the streaming performed by the server means and wherein the adaption means dynamically adapts the streaming rate in response thereto.

12. The system of claim 2 wherein the means for characterizing comprises means for calculating a bit rate throughput value.

13. The system of claim 12 wherein the means for calculating the bit rate throughput value comprises means for determining the data rate of a communications device utilized by the client computer to communicate with the server computer.

14. The system of claim 13 wherein the means for determining the data rate of the communications device utilized by the client computer comprises means for measuring a periodic rate at which discrete units of data are sent from the communications device to the client computer.

15. The system of claim 13 wherein the client computer comprises means for reporting the data rate to the server computer.

16. The system of claim 2 wherein the means for characterizing comprises means for calculating a percentage and distribution of packet loss.

17. The system of claim 16 wherein the means for calculating the percentage and distribution of packet loss comprises means for detecting missing units of information from the units of information received by the client computer.

18. The system of claim 17 wherein the client computer comprises means for reporting the percentage and distribution of packet loss to the server computer.

19. The system of claim 2 wherein the means for characterizing comprises means for calculating a round trip delay of the computer network.

20. The system of claim 19 wherein the means for calculating the round trip delay of the computer network comprises:

A) means for transmitting a first message from the server computer to the client computer;

B) means for transmitting a second message from the client computer to the server computer upon receipt of the first message by the client computer; and C) means for measuring an amount of time between transmitting the first message and receiving the second message upon receipt of the second message by the server computer.

21. The system of claim 19 wherein the means for calculating the round trip delay of the computer network comprises:

A) means for transmitting a first message from the client computer to the server computer;

B) means for transmitting a second message from the server computer to the client computer upon receipt of the first message by the server computer; and C) means for measuring an amount of time between transmitting the first message and receiving the second message upon receipt of the second message by the client computer.

22. The system of claim 2 wherein the means for characterizing comprises means for measuring an amount of jitter in the computer network.

23. The system of claim 22 wherein the means for measuring the amount of jitter in the computer network comprises means for measuring a time span between the receipt of successive units of information by the client computer.

24. The system of claim 23 wherein the client computer comprises means for reporting the amount of jitter to the server computer.

25. The system of claim 2 wherein the computer network is capable of losing units of information applied to it.

26. The system of claim 25 wherein the client computer comprises:

A) means for detecting that a unit of information was not received; and

B) means for informing the server computer of the lost unit of information.

27. The system of claim 26 wherein each unit of information comprises a pre-assigned sequence number and wherein the means for detecting that a unit of information was not received comprises means for detecting that the unit of information was received out of sequence.

28. The system of claim 27 wherein the means for informing the server computer of the lost unit of information comprises means for reporting the sequence number of the lost unit of information to the server computer.

29. A server device for streaming to a client device a multimedia file in a computer network, the multimedia file comprising a plurality of units of information, each unit having importance information pre-assigned to the unit, the server device comprising:

A) a computer-readable medium for providing the multimedia file; and

B) a multimedia server application for reading the units of information from the computer-readable medium and for streaming the units of information onto the computer network, the streaming means including adaption means for adapting the streaming rate of the streaming in response to network conditions and in response to the importance information.

30. The server device of claim 29 wherein the means for streaming the units of information onto the computer network comprises:

A) means for determining whether all units of the plurality of units of information have been streamed;

B) means for terminating streaming the method when all units of information have been streamed;

C) means for streaming a number of units of media information when less than all units of information have been streamed; and D) means for delaying for an amount of time calculated so as to maintain a bit rate of the stream at or below a predetermined bit rate.

31. The server device of claim 30 wherein the computer network is capable of losing units of information applied to it.

32. The server device of claim 31 wherein the multimedia server application further comprises means for deciding whether or not to retransmit a lost unit of information.

33. The server device of claim 32 wherein the means for deciding whether or not to retransmit the lost unit of information comprises:

A) means for obtaining a throughput rate of the computer network; and

B) first means for decreasing the streaming rate when the throughput rate of the computer network has decreased.

34. The server device of claim 32 wherein the means for deciding whether or not to retransmit the lost unit of information comprises:

A) means for determining whether a network-based problem exists;

B) means, responsive to a status indicating a network-based problem, for checking whether the network-based problem is caused by random losses in the computer network; and C) first means, cooperating with the means for checking whether the network-based problem is caused by random losses, for increasing the streaming rate when the network-based problem is caused by random losses in the computer network.

35. The server device of claim 32 wherein the means for deciding whether or not to retransmit the lost unit of information comprises:

A) means for determining whether a network-based problem exists;

B) means, responsive to a status indicating a network-based problem, for checking whether the network-based problem is caused by random losses in the computer network; and C) second means, cooperating with the means for checking whether the network-based problem is caused by random losses, for decreasing the streaming rate when the network-based problem is caused by other than random losses in the computer network.

36. The server device of claim 32 wherein the means for deciding whether or not to retransmit the lost unit of information comprises:

A) means for obtaining a throughput rate of the computer network;

B) first means for decreasing the streaming rate when the throughput rate of the computer network has decreased;

C) means for checking the status of the computer network when the throughput rate of the computer network has remained constant or increased;

D) means, responsive to a status indicating a network-based problem, for checking whether the network-based problem is caused by random losses in the computer network;

E) first means, cooperating with the means for checking whether the network-based problem is caused by random losses, for increasing the streaming rate when the network-based problem is caused by random losses in the computer network; and F) second means, cooperating with the means for checking whether the network-based problem is caused by random losses, for decreasing the streaming rate when the network-based problem is caused by other than random losses in the computer network.

37. The server device of claim 36 wherein the first and second means for decreasing the streaming rate comprises means for dropping at least one of the plurality of units of information.

38. The server device of claim 37 wherein the means for dropping comprises means for determining an importance of each unit of information.

39. The server device of claim 38 wherein the means for determining the importance comprises means for referencing an importance value pre-assigned to each unit of information.

40. The server device of claim 36 wherein the first means for increasing the streaming rate comprises means for transmitting multiple copies of at least one of the plurality of units of information.

41. A method of streaming a multimedia file, comprising a plurality of units of information, each unit having pre-assigned importance information, from a server to a client over a computer network so that the client may present the multimedia file as the units of information are received, the method comprising the steps of:

A) the server obtaining the units of information from the file;

B) the server streaming the units of information onto the computer network to the client at a streaming rate; and C) the server adapting the streaming rate of the streaming in response to network conditions and in response to the importance information.

42. The method of claim 41 wherein the computer network is capable of losing units of information applied to it.

43. The method of claim 41 wherein the method includes the step of the client detecting that a unit of information was not received and the client informing the server of the lost unit of information.

44. The method of claim 43 wherein the step of the client detecting that a unit of information was not received includes the step or the client monitoring sequence numbers residing in each streamed unit of information and detecting that a unit of information has a sequence number out of sequence.

45. The method of claim 44 wherein the step of informing the server of the lost unit of information includes the step of reporting the sequence number of the lost unit of information to the server.

46. The method of claim 45 wherein the method includes the step of the server deciding whether or not to retransmit the lost unit of information.

47. The method of claim 46 wherein the step of deciding whether or not to retransmit the lost unit of information comprises the steps of:

A) checking a throughput rate of the computer network;

B) if the throughput rate of the computer network has decreased, decreasing the streaming rate;

C) if the throughput rate of the computer network has not decreased, checking the status of the computer network;

D) if the status of the computer network indicates that a network-based problem exists
  D1) checking whether the network-based problem is caused by random losses in the computer network;
  D2) if the network-based problem is caused by random losses in the computer network, increasing the streaming rate; and
  D3) if the network-based problem is caused by other than random losses in the computer network, decreasing the streaming rate.

48. The method of claim 47 wherein steps B and D3 includes the step of dropping one or more of the plurality of units of information.

49. The method of claim 48 wherein the step of dropping one or more of the plurality of units of information includes the step of determining an importance of each unit of information.

50. The method of claim 49 wherein the step of determining the importance of each unit of information includes the step of referencing an importance value pre-assigned to each unit of information.

51. The method of claim 47 wherein the step of increasing the streaming rate includes the step of transmitting multiple copies of one or more of the plurality of units of information.

* * * * *

UNITED STATES PATENT AND TRADEMARK OFFICE
CERTIFICATE OF CORRECTION

PATENT NO.   : 5,928,330
DATED        : July 27, 1999
INVENTOR(S)  : Tom Goetz, Manickam R. Sridhar, Mukesh Prasad It is certified that error appears in the above-identified patent and that said Letters Patent is hereby corrected as shown below:

Column 16, claim 2,
Line 13, delete "means"
Line 14, delete "means"

Column 16, claim 11,
Line 49, delete "means"

Column 18, claim 30B),
Line 21, delete "the method"

Signed and Sealed this

Sixth Day of November, 2001

Attest:

*Nicholas P. Godici*

NICHOLAS P. GODICI
*Attesting Officer*   Acting Director of the United States Patent and Trademark Office